A. D. DAIGRE.
ELASTIC TIRE FOR WHEELS OF VEHICLES AND METHOD OF FORMING THE SAME.
APPLICATION FILED AUG. 11, 1917.

1,316,773. Patented Sept. 23, 1919.

Armand Delille Daigre
Inventor

By his Attorney

UNITED STATES PATENT OFFICE.

AMAND DELILLE DAIGRE, OF LEVALLOIS-PERRET, FRANCE.

ELASTIC TIRE FOR WHEELS OF VEHICLES AND METHOD OF FORMING THE SAME.

1,316,773.  Specification of Letters Patent.  Patented Sept. 23, 1919.

Application filed August 11, 1917. Serial No. 185,678.

*To all whom it may concern:*

Be it known that I, AMAND DELILLE DAIGRE, a citizen of the French Republic, and residing at 39 Route de la Révolte, Levallois-Perret, Seine, France, have invented certain new and useful Improvements Relating to Elastic Tires for Wheels of Vehicles and Methods of Forming the Same, of which the following is a specification.

This invention relates to elastic tires, made of india rubber or other suitable material, applicable to the wheels of vehicles generally, and made in such a manner as to render impossible puncturing and bursting, while giving great elasticity and easy running, and allowing of traveling at high speeds on roads. The invention is also designed to insure, in a particularly efficacious manner, the stability of the vehicle while reducing to a minimum the risk of side slipping.

The tire according to this invention has the form of a ring of india rubber of a particular section, presenting an annular cavity of 8-shape, this cavity being put in communication with the atmosphere at any desired number of points by means of hollow bolts, which serve at the same time for securing the tire on the rim.

The accompanying drawings illustrate, by way of example, some forms of construction of the tire forming the subject of the invention:—

Fig. 3 shows a perspective view in transverse section of the tire in the condition in which it exists at the end of the first stage of its manufacture.

Fig. 4 shows a cross section of the same tire in the condition in which it exists when its manufacture is finished.

Figure 1:
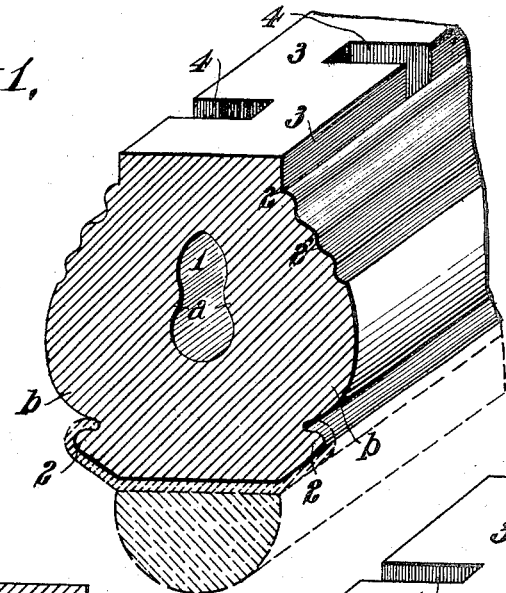
Figure 1 is a perspective view showing a transverse section of the tire, according to one form of construction.
Figure 2:
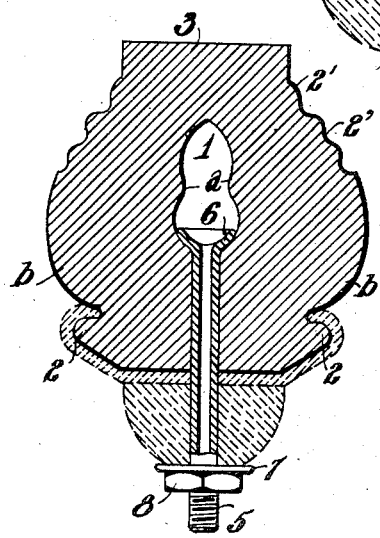
Fig. 2 shows a cross section of the same tire taken at the place where one of the hollow securing bolts is situated.

Referring to Figs. 1 and 2, in the first form of construction illustrated, the tire consists of an annulus of india rubber or other suitable elastic material, of the cross section shown in the figures, and formed with an internal annular cavity 1 extending approximately centrally through the tire section, this cavity being of 8-shape in section. This form of cavity has the advantage of leaving at *a a* an additional thickness of material, which resists the formation of fissures such as might otherwise result from the flexing of the tire when in use.

The tire has beaded edges or projections 2 serving for securing it in the rim in the usual manner. The rim is indicated in dotted lines in Figs. 1 and 2, engaging with the tire. Above the securing projections 2 the tire has a plain outwardly rounded surface, providing a thickness at this part which insures the effective engagement of the edges 2 with the rim and avoids all needless friction at the edges of the tire during running.

In order to increase the elasticity of the tire, in the part adjacent the tread surface, ribs and undulations are formed at 2' at the sides of the tire near to the tread, the depth of the undulations 2' being suited to the purpose for which the tire is intended, and preferably increasing gradually nearer the tread as shown.

The tread surface 3 is preferably flat, with notches or recesses formed alternately at one side and the other, as at 4, leaving a zig-zag flat tread area. This insures the stability above referred to, while owing to the form of the tire, and particularly to the notched flat tread surface, a very efficient resistance to side slipping is provided.

When the tire thus formed rolls on the road, it is of course somewhat deformed by the load of the vehicle which it supports; the air contained in the cavity 1 tends to escape in consequence of the compression to which it is subjected as a result of the deformations of the tire. Moreover, the tire also tends to become heated in consequence of the flexures and compressions which it undergoes during running. It is desirable to avoid these actions as they result in the rapid deterioration of the tire, that is to say it is desirable to insure cooling of the tire during running; for this purpose the cavity 1 is placed in communication with the atmosphere by the arrangement shown in Fig. 2. This arrangement consists in the use of bolts 5 with an axial passage therethrough for their whole length, the inner ends of the bolts being formed with heads 6 shaped so that they will engage in the bottom part of the cavity, as shown in Fig. 2 for one such bolt. The shank of the bolt passes through the inner part of the tire, through the metallic rim and the felly of the wheel, and its inner end has a washer 7 and nut 8 applied thereto rendering it possible to tighten up the bolt in order to secure the tire firmly to the rim and thus to hold it in place. Each tire has at least two such bolts, and generally more according to circumstances. The air can pass into and out of the tire freely through these bolts so that the air contained in the cavity 1 is being constantly changed. If two bolts only are used in a tire they will generally be placed diametrically opposite one to another, and if more than two are used they will be evenly spaced around the rim. Owing to the constant movement and changing of the air in the cavity, the cooling of the tire is insured in a very effective manner.

Figure 3:
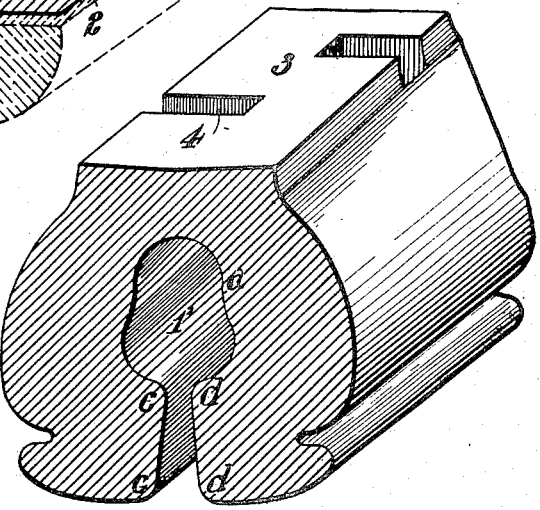
Figs. 3 and 4 illustrate another form of construction of the tire, modified in order to facilitate manufacture.
Figure 4:
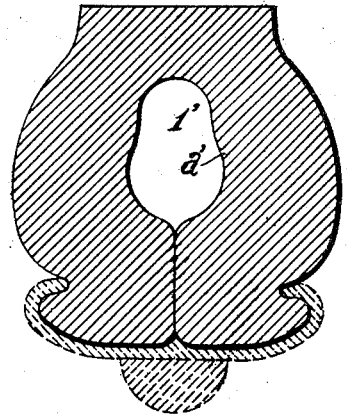

In the modification shown in Figs. 3 and 4 the tire is formed open radially around its whole circumference in the part at the base between the cavity and the portion which rests against the rim. Fig. 3 shows the form of the tire at the completion of the first stage of its manufacture, and this method of formation renders easy the molding of the tire with the desired cavity. In order to complete the manufacture it is only necessary to carry out a further operation of bringing together the edges $c$, $c$ and $d$, $d$ and uniting them by any suitable process such as vulcanization. The tire then has the form indicated in Fig. 4 ready for mounting upon the rim as indicated in dotted lines in that figure. During the molding spaces may be left of the section shown in Fig. 2, to accommodate the hollow bolts above referred to. For this purpose it is only necessary to form depressions of semi-cylindrical shape in each of the faces $c$, $c$ and $d$, $d$ before bringing these faces together, so as to leave a cylindrical hole to accommodate the bolt. Such holes are formed in any required number of places for the purpose stated.

It will be understood that if the hollow bolts are formed with heads 6, as will usually be the case, and as is shown in Fig. 2, which heads are intended to lodge inside the annular cavity of the tire, the bolts may be inserted before vulcanizing or otherwise connecting together the faces $c$, $c$ and $d$, $d$, Fig. 3. In this form of construction a ferrule or metallic tube is preferably inserted between the stem of the bolt and the tire, in order to form the walls of the cylindrical hole above referred to in which the bolt is accommodated. This ferrule or tube serves as a socket for the bolt and provides an abutment for the head of this latter and facilitates the movement of the bolt in the hole and the thrusting back of the bolt into the hole during the mounting and removal of the tire.

As will be seen from Fig. 4, the finished tire has an annular cavity 1', of roughly 8-shape leaving thickened walls at $a'$ in order to avoid the formation of fissures which might result at these points due to the flexure of the tire.

In this form of the tire the lateral external ribs and undulations 2' provided in the first form of construction have been omitted, as the tire is sufficiently supple without these ribs and undulations. The tire is provided, as in the first form of construction, with a flat tread surface 3, having recesses cut out in alternate positions at 4 in order to give a stable supporting surface and to resist side slipping.

Figure 5:
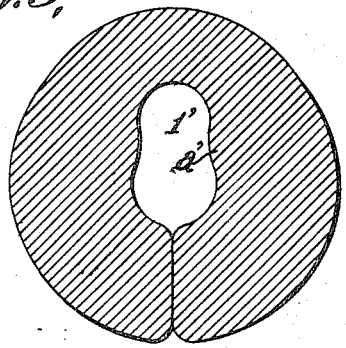
Fig. 5 shows, in transverse section, a modified form of the tire, designed to be used in place of an air tube inside a pneumatic tire cover of usual form.

The tire formed as above described, may be employed with but slight modification in place of the air tube of a pneumatic tire of usual form. All that is required for this purpose, as Fig. 5 shows, is to omit the beaded edges for securing the tire to the rim, and to form the outer surface rounded instead of forming it with a flat tread; the tire so formed is fitted with hollow bolts for the free circulation of the air. These bolts also serve the purpose of securing the tire to the rim, for which purpose it is always necessary to use bolts in tires of this type for road vehicles.

Having thus described my invention what I claim as new and desire to secure by Letters Patent is:—

1. The combination with an elastic tire formed with a continuous internal cavity, of a plurality of hollow bolts providing air passages therethrough passing into said cavity and projecting outwardly at the base thereof, whereby the internal cavity is placed continuously in communication with the atmosphere.

2. The combination of an elastic tire formed with an annular cavity, a rim upon which said tire fits, and a plurality of hollow securing bolts providing air passages therethrough passing from said cavity through the tire and the rim, with means for securing said bolts inside the rim, whereby the tire is secured on the rim and whereby the cavity in the tire is placed in continuous comunication with the atmosphere.

3. The method of forming an elastic tire with an annular cavity therein, which consists in molding the tire with the base portions thereof separated by a gap extending from the cavity to the base, and subsequently uniting the base portions, a plurality of hollow bolts being interposed between the walls of the gap in such a manner that they may be moved into the cavity when it is desired to remove the tire from the rim.

4. The method of forming an elastic tire with an annular cavity therein, which consists in molding the tire with the base portions thereof separated by a gap extending from the cavity to the base, fitting a plurality of hollow bolts with the heads thereof in said cavity and the stems thereof projecting beyond the base, and subsequently uniting the base portions of the tire with said hollow bolts projecting therethrough.

5. The method of forming an elastic tire with an annular cavity therein, which consists in molding the tire with the base portions thereof separated by a gap extending from the cavity to the base, fitting a plurality of hollow bolts with ferrules thereon in the space between said base portions of the tire, and subsequently uniting said base portions with the ferrules in position therein, in such manner as to provide sockets for the bolts which pass therethrough.

6. An elastic tire having an annular cavity therein, and a pulrality of hollow bolts providing air passages therethrough with heads inside the cavity, and stem portions extending through the base of the tire between portions of the base united with said bolts passing therethrough.

7. An elastic tire having an annular cavity therein, a plurality of ferrules adapted to serve as sockets for bolts, and hollow bolts passing through said ferrules, said hollow bolts having heads inside the cavity and said ferrules being disposed between portions of the tire at the base thereof which are united with the ferrules and bolts therebetween, in such manner that the cavity is closed except at the points where the hollow bolts are situated, said bolts providing passages communicating with the atmosphere.

8. An elastic tire formed with an annular cavity of 8-shaped section, a flattened tread surface, undulations in the side walls adjacent said tread surface, and hollow bolts providing communication between said cavity and the atmosphere.

AMAND DELILLE DAIGRE.